US008559518B2

(12) United States Patent
Chappalli et al.

(10) Patent No.: US 8,559,518 B2
(45) Date of Patent: Oct. 15, 2013

(54) SYSTEM AND METHOD FOR MOTION ESTIMATION OF DIGITAL VIDEO USING MULTIPLE RECURSION RULES

(75) Inventors: Mahesh B Chappalli, Irvine, CA (US); Yeong-Taeg Kim, Irvine, CA (US)

(73) Assignee: Samsung Electronics Co., Ltd., Suwon, Gyeonggi-Do (KR)

( * ) Notice: Subject to any disclaimer, the term of this patent is extended or adjusted under 35 U.S.C. 154(b) by 1145 days.

(21) Appl. No.: 12/164,939

(22) Filed: Jun. 30, 2008

(65) Prior Publication Data

US 2009/0322956 A1    Dec. 31, 2009

(51) Int. Cl.
*H04N 11/02*    (2006.01)

(52) U.S. Cl.
USPC .................................................. 375/240.16

(58) Field of Classification Search
USPC ............... 375/240–240.29; 348/400.1–402.1, 348/403.1, 407.1, 416.1, 420.1, 431.1
See application file for complete search history.

(56) References Cited

U.S. PATENT DOCUMENTS

| | | | |
|---|---|---|---|
| 6,278,736 B1 | 8/2001 | De Haan et al. | |
| 6,385,245 B1 * | 5/2002 | De Haan et al. | 375/240.16 |
| 6,782,054 B2 * | 8/2004 | Bellers | 375/240.27 |
| 6,996,175 B1 | 2/2006 | Olivieri | |
| 6,996,177 B1 * | 2/2006 | Beuker | 375/240.16 |
| 7,480,334 B2 * | 1/2009 | Nair | 375/240.16 |
| 7,801,218 B2 * | 9/2010 | Olivier et al. | 375/240.16 |
| 7,929,609 B2 * | 4/2011 | Riemens et al. | 375/240.16 |
| 2007/0064803 A1 | 3/2007 | Miao et al. | |

OTHER PUBLICATIONS

G. A. Thomas, *Television motion measurement for DATV and other applications*, Tech. Rpt. Nov. 1987, BBC Research Dept., 1987.
G. de Haan et al., *Sub-pixel motion estimation with 3-d recursive search block matching*, Signal Processing: Image Communication, No. 6, pp. 229-239, 1994.
G. de Haan et al., *True-motion estimation with 3-d recursive search block matching*, IEEE Trans. DSVT, vol. 3, No. 5, Oct. 1993, pp. 368-379.
G. de Haan et al., *An efficient true-motion estimator using candidate vectors from a parametric motion model*, IEEE Trans. CSVT, vol. 8, pp. 85-91, 1998.
G. de Haan, *Progress in motion estimation for consumer video format conversion*, IEEE Trans. Consumer Elec., vol. 46, No. 3, pp. 2000, 2 pages.
Toru Yamada et. al., "Fast and accurate motion estimation algorithm by adaptive search range and shape selection," ICASSP 2005, pp. II-897-900.
Hwang-Seok Oh et. al., "Adaptive adjustment of the search window for block-matching algorithm with variable block size," IEEE Trans. Consumer Electronics, vol. 44, No. 3, pp. 659-666, Aug. 1999.

* cited by examiner

*Primary Examiner* — Dmitry H Levitan
(74) *Attorney, Agent, or Firm* — IP Investment Law Group

(57) ABSTRACT

A system and method of providing motion estimation is disclosed. A recursive motion estimation module applies multiple recursive motion estimation rules which have complimentary performance advantages. A selection module provides a switching scheme which determines which rule to apply to a specific block within a video frame.

25 Claims, 11 Drawing Sheets

| 202(0) | 202(1) | 202(2) |
|---|---|---|
| 202(3) | 202(4) | 202(5) |
| 202(6) | 202(7) | 202(8) |

*FIG. 4*

| 202(0) | 202(1) | 202(2) | 202(3) | 202(4) |
|---|---|---|---|---|
| 202(5) | 202(6) | 202(7) | 202(8) | 202(9) |
| 202(10) | 202(11) | 202(12) | 202(13) | 202(14) |
| 202(15) | 202(16) | 202(17) | 202(18) | 202(19) |
| 202(20) | 202(21) | 202(22) | 202(23) | 202(24) |

*FIG. 7* ated digital video processing have allowed video display manufacturers to produce systems which provide a more realistic viewing experience by enhancing raw digital video. Motion estimation algorithms are commonly used in providing enhanced video. For example, motion estimation algorithms are often utilized when performing de-interlacing of video, video format conversion, and frame rate conversion. Among the different types of motion estimation algorithms, block matching algorithms are often chosen for their superior trade-off between complexity (which is relatively low) and accuracy (which tends to be high). Block matching algorithms generally compare a given arbitrary block in one frame of video to one or more blocks from another frame of video in order to find a suitable matching block.

SYSTEM AND METHOD FOR MOTION ESTIMATION OF DIGITAL VIDEO USING MULTIPLE RECURSION RULES

BACKGROUND OF THE INVENTION

1. Field of the Invention

This application relates to motion estimation in display devices. In particular, this application relates to systems and methods for determining motion vectors for blocks of frame data.

2. Description of the Related Technology

In recent years, advancements in digital video processing have allowed video display manufacturers to produce systems which provide a more realistic viewing experience by enhancing raw digital video. Motion estimation algorithms are commonly used in providing enhanced video. For example, motion estimation algorithms are often utilized when performing de-interlacing of video, video format conversion, and frame rate conversion. Among the different types of motion estimation algorithms, block matching algorithms are often chosen for their superior trade-off between complexity (which is relatively low) and accuracy (which tends to be high). Block matching algorithms generally compare a given arbitrary block in one frame of video to one or more blocks from another frame of video in order to find a suitable matching block.

Recursive search techniques form one category of block matching algorithms. Recursive motion estimation typically involves evaluating a limited set of candidate motion vectors to determine the best motion vector for a given block of pixels in a video frame. In implementing a recursive search strategy, a specific recursion rule is typically selected that determines the candidate motion vectors to be evaluated. Each recursion rule has certain characteristics. As a result, the use of a specific recursion rule may often result in certain performance advantages and disadvantages. For example, some recursive rules may generally perform well and be computationally inexpensive but they may not be well-suited for cases of sudden or rapid change in motion of objects. Other recursion rules may perform adequately in cases of sudden or rapid change in motion of objects, but may be sensitive to problems such as noise, low dynamic range, and multiple matches. Accordingly, it would be useful to provide a motion estimation technique designed to alleviate shortcomings associated with the use of a single recursion rule.

SUMMARY OF CERTAIN INVENTIVE ASPECTS

In a first embodiment, a method of providing motion estimation between video frames in a device is provided. The method comprises receiving a first frame of video and estimating a first motion vector for a first block in the first frame of video using a first recursive motion estimation rule. The method further includes estimating a second motion vector for a second block in the first frame of video using a second recursive motion estimation rule.

In a second embodiment, a device is configured to perform a method of providing motion estimation. The method includes receiving a first frame of video and estimating a first motion vector for a first block in the first frame of video using a first recursive motion estimation rule. A second motion vector is estimated for a second block in the first frame of video using a second recursive motion estimation rule.

In a third embodiment, a method of providing motion estimation in a display device is provided. The method includes receiving a first frame of video. The first frame of video comprises a plurality of blocks. The method further includes estimating a motion vector for each of the plurality of blocks by applying one of a plurality of recursive motion estimation rules to each block. Each of the plurality of recursive motion estimation rules is used to estimate a motion vector for at least one block in the frame.

BRIEF DESCRIPTION OF THE DRAWINGS

FIG. 4 is a block diagram of a 3×3 neighborhood of motion vector candidates centered at a block under consideration.

FIG. 7 is a block diagram of a asymmetrical 5×5 neighborhood of motion vector candidates near a block under consideration.

DETAILED DESCRIPTION OF CERTAIN INVENTIVE EMBODIMENTS

Various disclosed embodiments include a system and method for providing motion estimation in a display device by utilizing recursive motion estimation rules that have complimentary strengths, and alternating the usage of the rules to achieve an accurate and efficient motion estimation result. The rules may be designed such that scenarios which implicate the weakness of one rule are minimized by utilizing a second recursion rule in which the scenario plays into the strength of second recursion rule. The recursive rules applied to a particular block may be alternated from frame to frame to ensure that there is no increase of demand on computational resources. Utilizing this type of a recursion scheme involving the use of two (or more) recursion rules, the computational efficiency of recursive motion estimation is retained due to the limited number of motion vector candidates evaluated for each individual block. At the same time, however, the use of complimentary recursion rules allows for a broader range of candidates to be evaluated over spatio-temporal locations to produce a more precise motion estimation result.

Figure 1:
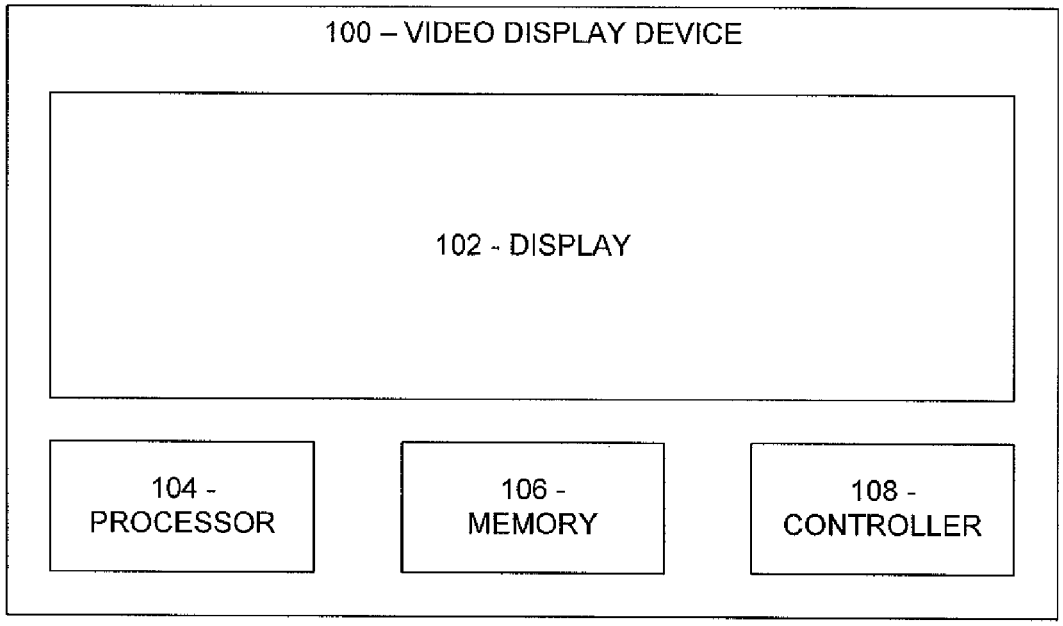
FIG. 1 is a block diagram of a video display device suitable for practicing various embodiments.

FIG. 1 is a block diagram of a display device 100 suitable for practicing one or more aspects described herein. The display device 100 may be a display incorporated into any one of various different types of audio/visual devices including a television, a computer monitor, a mobile telephone, a PDA, a handheld computer, or some other computing device with a graphic display made available to users.

The display device 100 includes various components including a display 102. The display 102 may be any of a number of different types of displays. In one embodiment, the display may be an LCD display. Alternatively, the display may be a plasma display, a CRT display, a DLP projector, or some other display type known in the art. The display device 100 also may include a processor 104. The processor 104 may be any of various types of processors. The processor 104 may be a central processing unit (CPU) with on board graphics capabilities. Other types of processors 104 may also be used. The display device 100 may further include a controller 108. The controller 108 generally receives raw image data from the processor 104 or some other internal device components. Once the data has been received, the controller 108 reformats the raw image data into a format suitable for scanning across the display 102 and sends the reformatted image data to the display 102. In some embodiments, the controller 108 may be associated with the processor 104 as a stand-alone Integrated Circuit (IC). However, the controller 108 may be implemented in various ways. For example, the controller may be embedded in the processor 104 as hardware, embedded in the processor 104 as software, or fully integrated in hardware with the display 102 itself.

Also included in the display device is a memory 106. The memory 106 may also take various forms. In one embodiment, the memory 106 may be dedicated on board chip memory that is included with one or both of the processor 104 and the controller 108. Alternatively, the memory 106 may be general purpose memory that is shared with other hardware and software included in the device. The memory 106 may be some form of random access memory (RAM) such as DRAM, SRAM, VRAM, SDRAM or the like, or it may some other form of memory such as flash memory, for example, which may be used to store data.

Although the illustrative display device 100 has been described with reference to a particular configuration in FIG. 1, a skilled artisan will readily appreciate that the display device 100 may take many forms and configurations. Moreover, the display device 100 may include various other system components not described herein which provide other features generally applicable to the device 100.

Figure 2A:
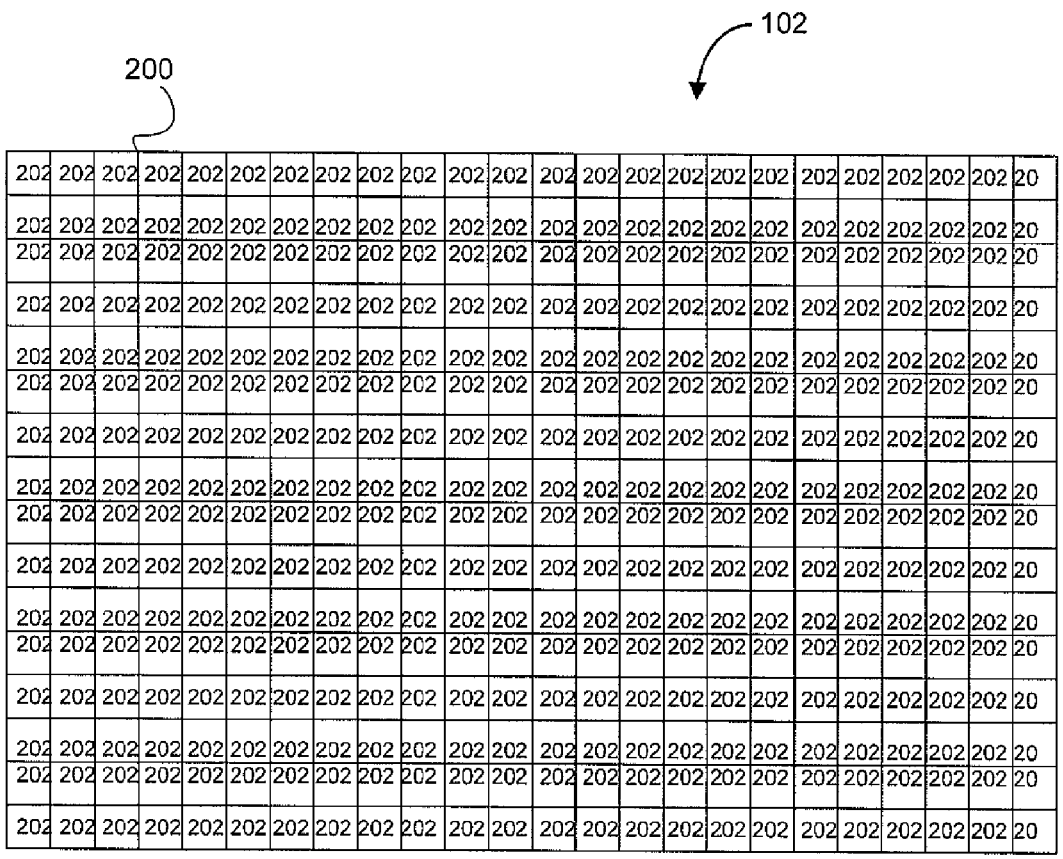
FIG. 2A is block diagram showing a more detailed view of a frame of the display shown in FIG. 1.
Figure 2B:
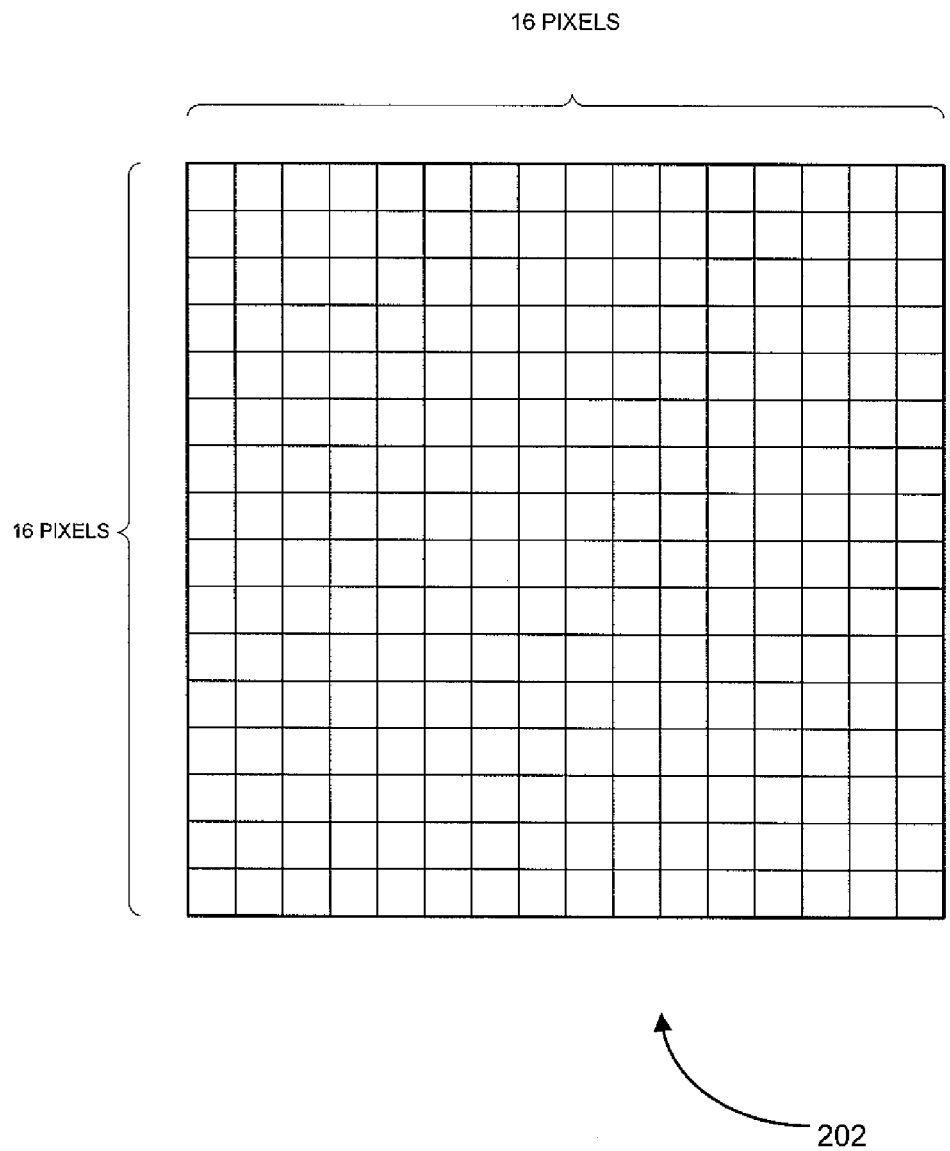
FIG. 2B is an example of a block as shown in FIG. 2A.

Referring now to FIG. 2, an example of a frame 200 of the display 102 is provided. Video data is typically presented in the display device 100 as a series of video frames 200. Each frame 200 may be divided into an array of blocks 202. The blocks 202 are typically rectangular groups of pixels having a fixed size. For example, each frame in the display may be partitioned into 16 by 16 pixel blocks 202 as shown in FIG. 2B. Other block sizes and/or shapes may be used.

Figure 3A:
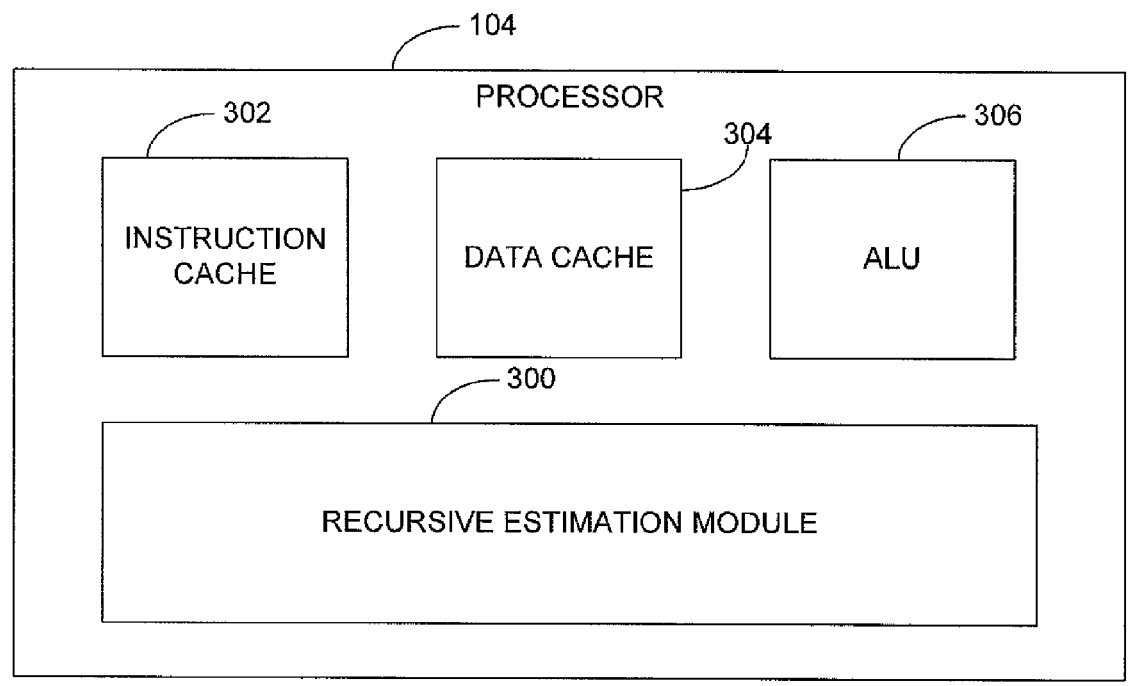
FIG. 3A is a block diagram showing components of the processor from FIG. 1.
Figure 3B:
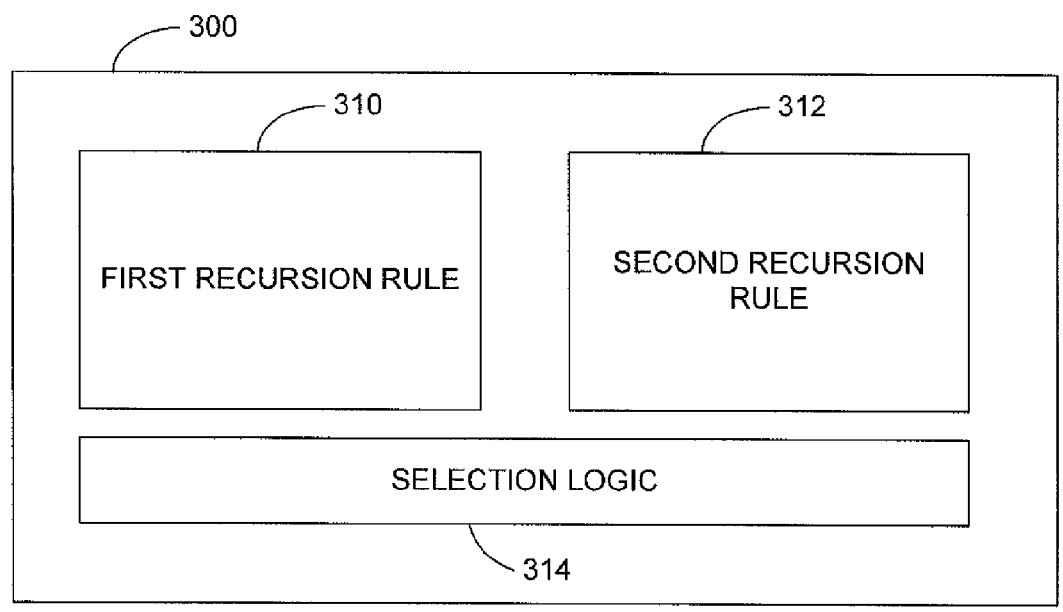
FIG. 3B is a block diagram showing subcomponents of the recursive estimation module from FIG. 3A.

Referring now to FIG. 3, a block diagram of the processor 104 is provided. As shown in the figure, the processor 104 may include a recursive estimation module 300. The recursive estimation module 300 typically takes the form of software or hardware which is configured to implement one or more recursive motion estimation algorithms to yield a motion vector for the blocks in a frame, and is discussed in additional detail below with reference to FIG. 3B. The processor 104 may also include an instruction cache 302. The instruction cache 302 may be used to speed up executable instruction fetch as is known in the art. The data cache 304 may include memory storage which allows the processor to more efficiently retrieve and store data in memory. The processor 300 may also include an arithmetic logic unit (ALU) 306. The ALU 306 may be a digital circuit that performs arithmetic and logical operations. In some embodiments, the ALU 306 may be tasked with performing the necessary arithmetic operations to implement the recursive motion estimation algorithms provided by the recursive motion estimation module 300.

FIG. 3B is a more detailed view of the recursive estimation module 300. The recursive motion estimation module 300 may be configured to apply different recursion rules to different blocks within a single frame. Typically, the recursive motion estimation module 300 proceeds in a block-by-block manner from left to right across each row of the block array, starting at the top of the display frame and moving toward the bottom. The recursive motion estimation module 300 may be configured to evaluate a limited set of candidate motion vectors which are drawn from both spatially and temporally neighboring blocks in order to estimate the best motion vector for the current block. As used herein, the current block refers to the block in a frame for which a motion vector is in the process of being estimated. Because the recursion rules provided by the motion estimation module 300 generate a motion vector for a given block by evaluating motion vectors of neighboring blocks in both a current and a previous frame, it is necessary to provide information from multiple frames of video data to the recursive module 300. In order to provide this access, the data from a previous video frame (original frame data plus other computed data such as motion information) may be stored in memory 106 (or possibly in data cache 304) so that it may be accessed by the recursive module 300 to apply the recursion rules against the frame data.

As noted above, recursive estimation module 300 may implement one or more different recursion algorithms or rules to determine motion vectors. In the example provided in FIG. 3B, the recursive motion estimation module 300 is configured to implement two recursion rules: first recursion rule 310, and second recursion rule 312 (which are discussed in detail below). The recursive estimation module 300 also may include selection logic 314. The selection logic 314 is generally used to determine the recursion rule to apply to a given block. In some embodiments, the selection logic 314 may perform basic switching between recursion rules 310 and 312 such that one of the two rules is alternately applied from block to block with the order switching on a frame-to-frame basis. Thus, if first recursion rule 310 is applied to a specific block in one frame, the second recursion rule 312 is applied to that same block in the subsequent frame.

The recursion rules provided by the recursion estimation module 300 may be complimentary in their strengths and weaknesses. That is, the weakness inherent in one rule may be offset by a corresponding strength in another rule. In one embodiment, the first recursion rule 310 may draw motion vector candidates from a 3×3 spatio-temporal neighborhood centered at the block under consideration to produce relatively smooth and coherent motion fields. Turning now to FIG. 4, an example of a group of blocks 202 is provided which may be used by the first recursion rule 310 to estimate motion vectors for a current block. In this particular example, the group of blocks includes blocks 202(0) . . . 202(8) with block 202(4) being the current block (situated in the center of the group).

In estimating a motion vector for the current block 202(4), the first recursion rule 310 may evaluate the motion vectors of each surrounding block 202(0)-202(3) and 202(5)-202(8) as well as the motion vector of block 202(4) in the previous frame to determine a motion vector for the current block 202(4). Typically, the motion vectors used by the first recursion rule 310 for blocks 202(0)-202(3) are the motion vectors previously calculated for blocks 202(0)-202(3) in the current frame, while the motion vectors used by the first recursion rule 310 for blocks 202(4)-202(8) may be the motion vectors for the immediately preceding frame which is stored in memory 106. The reason that the motion vectors of the blocks 202(4)-202(8) are drawn from the prior frame is the standard top to bottom and left to right progression of processing of blocks 202. Of course, if the processing of blocks does not progress left to right and top to bottom, the frame locations of motion vectors used by the first recursion rule 310 may differ.

Figure 5:
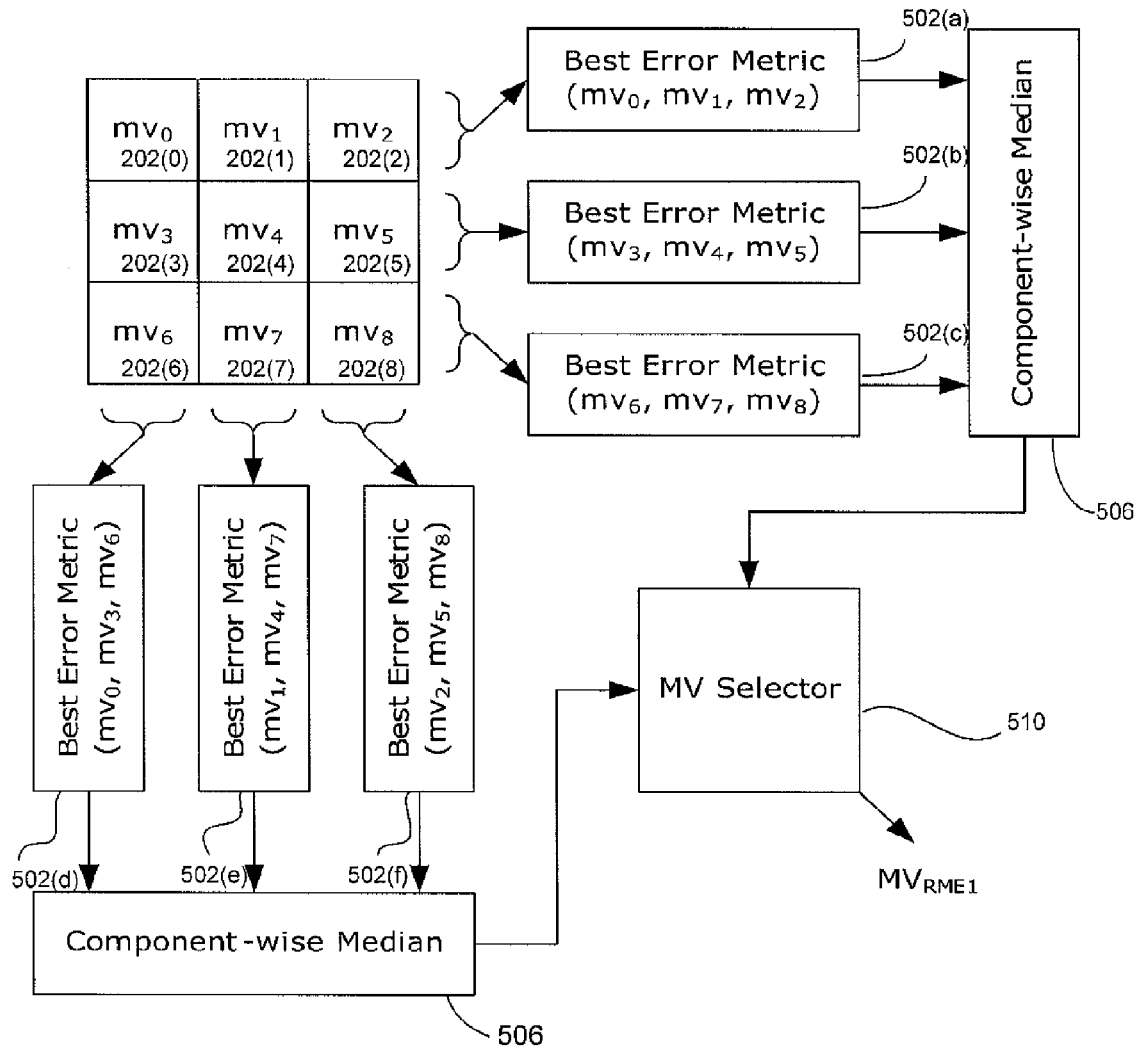
FIG. 5 is a diagram illustrating a first recursive motion estimation technique.

FIG. 5 is a diagram illustrating an example of the program logic used by the first recursion rule 310 to determine a motion vector $MV_{RME}$ (motion vector by recursive motion estimation) for a current block 202(4) of the group of blocks 202(0) ... 202(8) from FIG. 4. As shown in the figure, $mv_0 \ldots mv_3$ are the motion vectors for the already processed blocks in the frame 200. Because the motion estimation typically proceeds block-by-block from top to bottom and left to right in the frame 200, the motion vectors $mv_4 \ldots mv_8$ are the motion vectors of the corresponding blocks from the previous frame.

In the program logic shown in FIG. 5, the first recursion rule 310 is generally configured to calculate an error metric for each of the motion vectors $mv_0 \ldots mv_8$ applied to the current block 202(4) and utilize the error metrics to determine $MV_{RME1}$ (first motion vector by recursive motion estimation) for the current block 202(4). In the particular embodiment shown in FIG. 5, a best error metric value 502(a) among the error metrics corresponding to the motion vectors $mv_0 \ldots mv_2$ which are associated with the first row of blocks 202(0) ... 202(2) is determined. Best error metric values 502(b) and 502(c) are also determined for the motion vectors $mv_3 \ldots mv_5$ of the second row of blocks 202(3) ... 202(5) and for the motion vectors $mv_6 \ldots mv_8$ of the third row of blocks 202(6) ... 202(8) respectively. Similarly, best error metric values 502(d), 502(e), and 502(f) are determined for the motion vectors for each column in the group of blocks 202. Depending on the implementation environment, the best error metric value may be the lowest error metric value or it may be the highest error metric value.

In one embodiment, the error metric values are determined as a function of a mean absolute difference (MAD) between two blocks for the motion vector $mv_n$ plus a penalty value. This function may be expressed as:

Error Metric=MAD+Penalty

The MAD value may be calculated in various ways. In one embodiment, the MAD for a motion vector mv=(dx, dy) relating blocks existing in frames indexed by t1 and t2 is calculated according to the equation $$MAD(mv) = \frac{1}{mn}\sum_{i=0}^{m-1}\sum_{j=0}^{n-1} |B_{x,y}^{t1}(i,j) - B_{x+dx,y+dy}^{t2}(i,j)|$$

where $B_{x,y}^{t1}(i, j)$ represents pixel (i, j) within block $B_{x,y}^{t1}$ whose top-left corner is located at (x, y) in a frame indexed by t1. In this representation, location (0,0) within the block refers to the block starting position of (x, y).

The motion of blocks with low variance typically cannot be estimated with a high degree of reliability and hence it is desirable to suppress the contribution of neighboring blocks with low variance in determining the motion vector of the current block. This may be achieved by including a penalty term in the error metric that depends on block variance with lower variance resulting in higher penalties and vice versa. Consequently, the error metric of blocks with low variance is increased, reducing the probability of the corresponding motion vector being picked in its row/column. Accordingly, the penalty term shown above may be implemented according to the equation Penalty=$\kappa/\sigma$ where $\kappa$ is a heuristically determined constant and $\sigma$ is an approximation of the block variance which may be computed using the equation $$\sigma = \frac{1}{mn}\sum_{i=0}^{m-1}\sum_{j=0}^{n-1} |B_{x,y}^{t1}(i,j) - \mu|$$

where $$\mu = \frac{1}{mn}\sum_{i=0}^{m-1}\sum_{j=0}^{n-1} B_{x,y}^{t1}(i,j)$$

The motion vectors corresponding to the best error metric values 502(a), 502(b) and 502(c) are then input into a median filter module 506 which outputs a first median motion vector value. The median filter module 506 computes a component-based median value, e.g., a separate median value is determined from the three x-inputs of the motion vectors (corresponding to the horizontal displacement) and the three y-inputs of the motion vectors (corresponding to the vertical displacement) respectively. The two median values are combined into one motion vector and output to a selection sub-module 510. The motion vectors corresponding to the best error metric values 502(d), 502(e), and 502(f) are also passed to a median filter module 506, and a second motion vector value is determined and output to the selection sub-module 510. The selection sub-module 510 then selects the motion vector (of the two motion vectors received from the median filter modules 506) corresponding to the least error among the two inputs and outputs the motion vector as $MV_{RME1}$.

Figure 6:
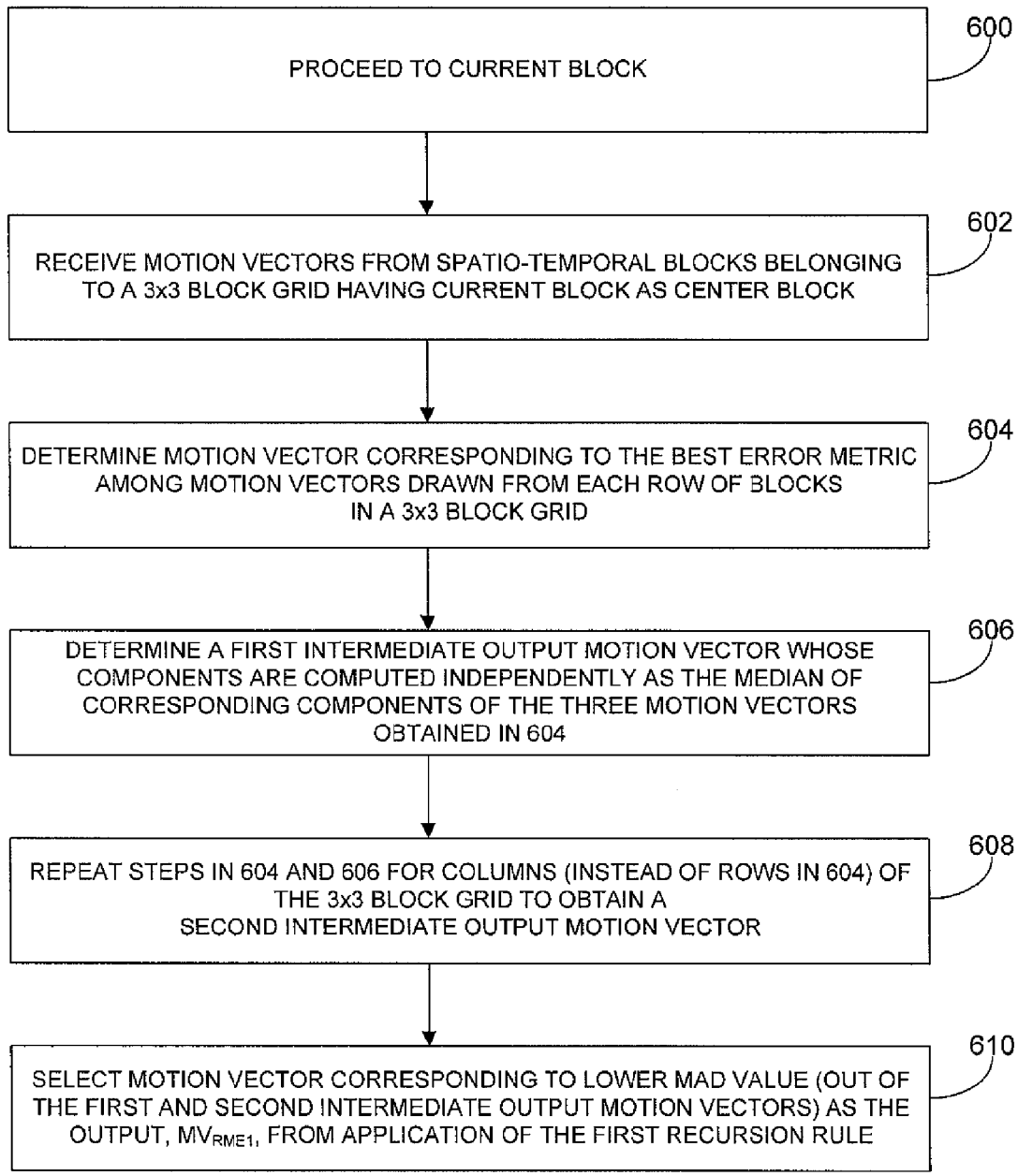
FIG. 6 is a flowchart of the recursive motion estimation techniques illustrated in FIG. 5.

FIG. 6 is a flowchart illustrating the process for obtaining a motion vector using the first recursion rule 310 as shown in FIG. 5 above. The process begins at box 600, where the recursive module 300 moves to the current block. At box 602, the recursive motion estimation module 300 receives motion vectors from each of the spatio-temporally located blocks belonging to a 3×3 block grid having the current block as the center block. The motion vector for the location corresponding to the center block in the grid (same position as the current block) may be drawn from the stored motion vector in the previous frame. Next, at box 604, the recursive estimation module 300 determines the motion vectors corresponding to the best error metric for motion vectors drawn from each row of blocks in the 3×3 block grid (three motion vectors—one from each row). The process continues at box 606 where the recursive motion estimation module 300 determines an intermediate output motion vector. The components of this intermediate output motion vector are computed independently as the median values of the corresponding components of the three motion vectors obtained in 604. The steps described in boxes 604 and 606 are then repeated in box 608 for columns of blocks in the 3×3 block grid (instead of rows as was done in box 604) to obtain a second intermediate output motion vector. Once the two intermediate output motion vectors are available, at box 610, the selection sub-module 510 selects the motion vector which corresponds to the lower MAD value (among the two intermediate output motion vectors) as the final motion vector for the current block, $MV_{RME1}$.

It is to be appreciated that the first recursion rule 310, like most recursive motion estimation algorithms, has certain performance strengths and certain drawbacks. Its inherent median selection operation ensures that the result is relatively immune to noise and it produces smooth and coherent motion fields. However, the use of the first rule 310 also results in certain performance deficiencies. First, because motion vector candidates are drawn from a small 3×3 neighborhood, the first recursion rule 310 is unable to effectively track object motion in certain directions. In particular, the first recursion rule 310 tends to poorly track motion of objects moving against the scanning direction. Moreover, fast moving objects and small objects do not track well using the first recursion rule 310.

In order to offset some of the performance drawbacks associated with the first recursion rule 310, the second recursion rule 312 may be configured in such a way that its performance strengths can offset the performance drawbacks associated with the first rule. In one embodiment, the second recursion rule 312 may draw motion vector candidates from an asymmetric 5×5 spatio-temporal neighborhood around the block under consideration. From the motion vector candidates, the motion vector corresponding to the best error metric (as described in detail below) is selected. This rule provides a significantly improved ability to track motion of objects moving against the scanning direction relative to the first recursion rule 310. However, in comparison to the first recursion rule 310, desirable attributes such as robustness to noise, consistency and smoothness of the estimated motion field, are suppressed by this second recursion rule 312.

Turning now to FIG. 7, an example of a 5×5 neighborhood group of blocks 202 is provided which may be used by the second recursion rule 312 to estimate motion vectors for a current block. In this particular example, the group of blocks includes blocks 202(0) . . . 202(24) with block 202(7) being the current block. Unlike the first recursion rule 310, the block under consideration in the second recursion rule 312 is not necessarily in the center of the 5×5 neighborhood of candidates.

In estimating a motion vector for the current block 202(8), the second recursion rule 312 may evaluate motion vector candidates which are drawn from the blocks 202(0)-202(24). As with the first recursion rule, the motion vectors for those blocks that have already been calculated in the current frame may be used (e.g., blocks 202(0) through 202(6)), while the motion vectors for the previous frame are used with respect to blocks 202(7) through 202(25).

Figure 8:
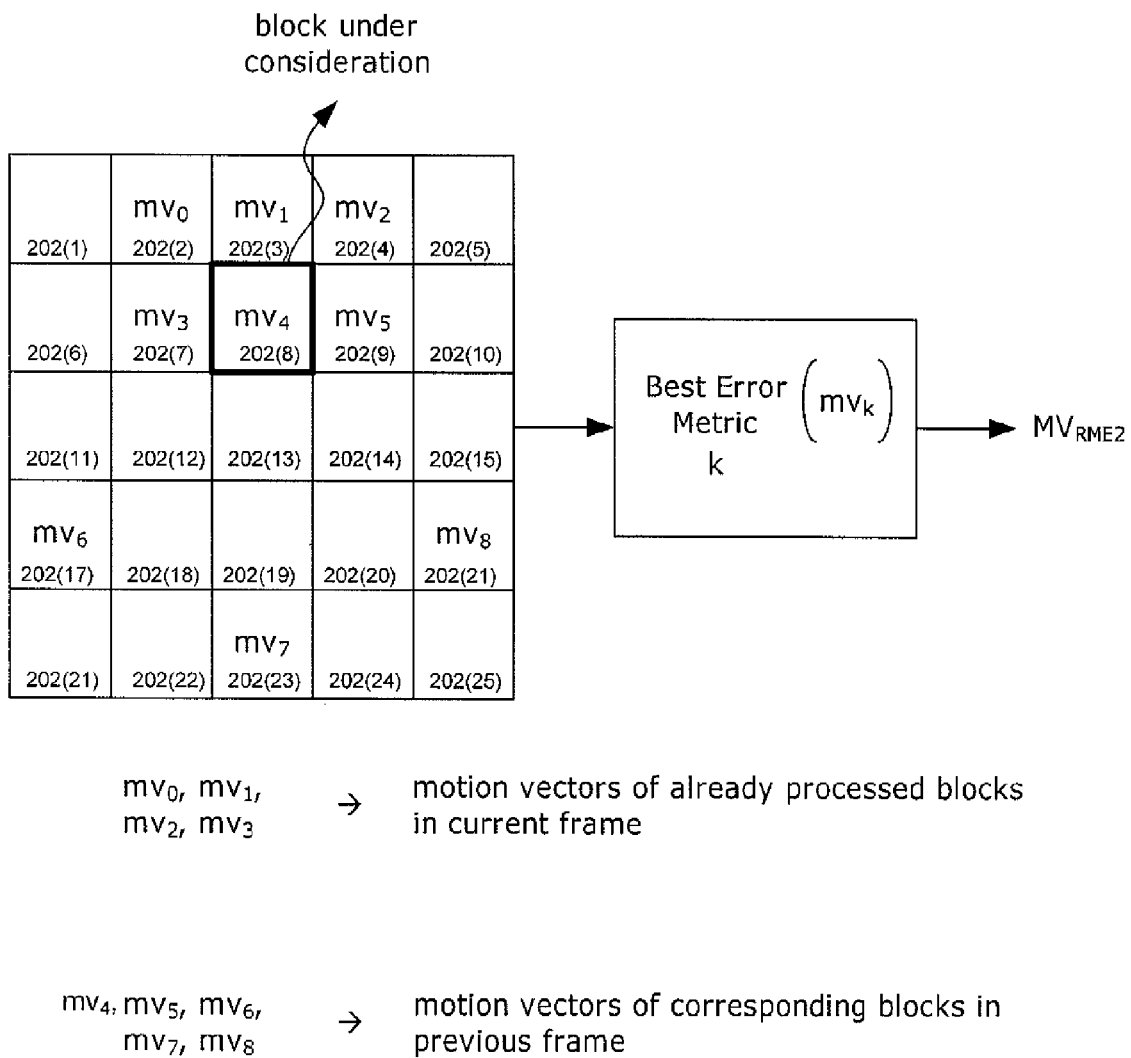
FIG. 8 is a diagram illustrating a second recursive motion estimation technique.

FIG. 8 is a diagram illustrating an example of the program logic used by the second recursion rule 312 to determine a motion vector $MV_{RME2}$ (second motion vector by recursive motion estimation) for a current block 202(7) of the group of blocks 202(0) . . . 202(24) shown in FIG. 7. Nine candidate motion vectors, $mv_0 \ldots mv_8$, are identified in the 5×5 neighborhood. In some embodiments, the choice of candidate motion vectors is arbitrary. Alternatively, candidate motion vectors may be selected based on characteristics of the blocks under consideration. Moreover, the neighborhood need not be a 5×5 neighborhood, and different sized neighborhoods may be utilized. As shown, $mv_0 \ldots mv_3$ are the motion vectors for the already processed blocks in the frame 200. Because the motion estimation typically proceeds block-by-block from top to bottom and left to right in the frame 200, the motion vectors $mv_4 \ldots mv_8$ are the motion vectors of the corresponding blocks from the previous frame. The second recursion rule 312 calculates the best error metric among the identified motion vector candidates ($mv_0 \ldots mv_8$) and the corresponding motion vector is outputted as $MV_{RME2}$. The best error metric may be calculated by determining the lowest mean absolute difference (MAD) among the candidates, or it may utilize the MAD plus a penalty value (as described above).

Figure 9A:
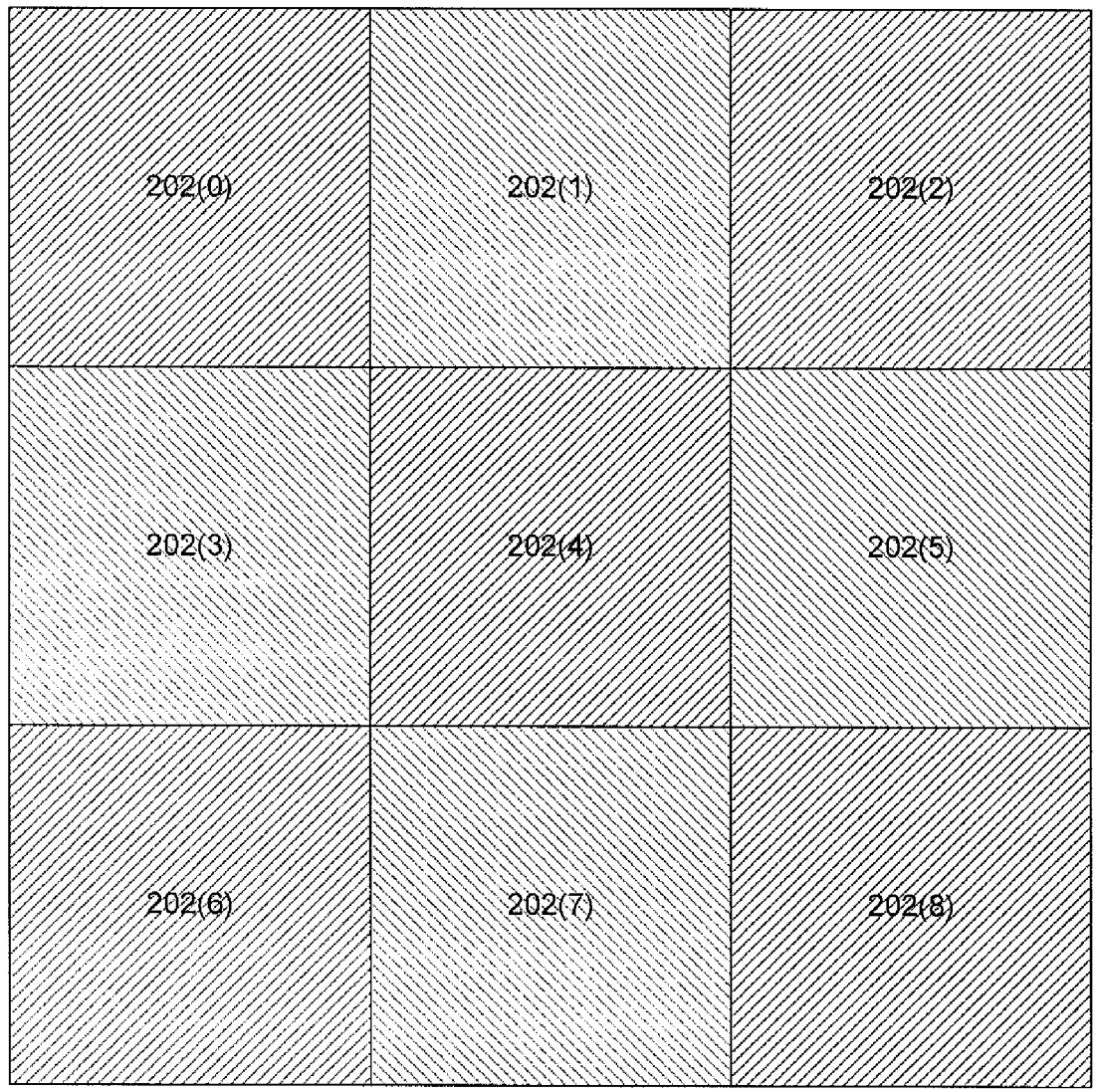
FIGS. 9A and 9B provide an example of how the selection logic from FIG. 3B may be implemented in adjacent frames.
Figure 9B:
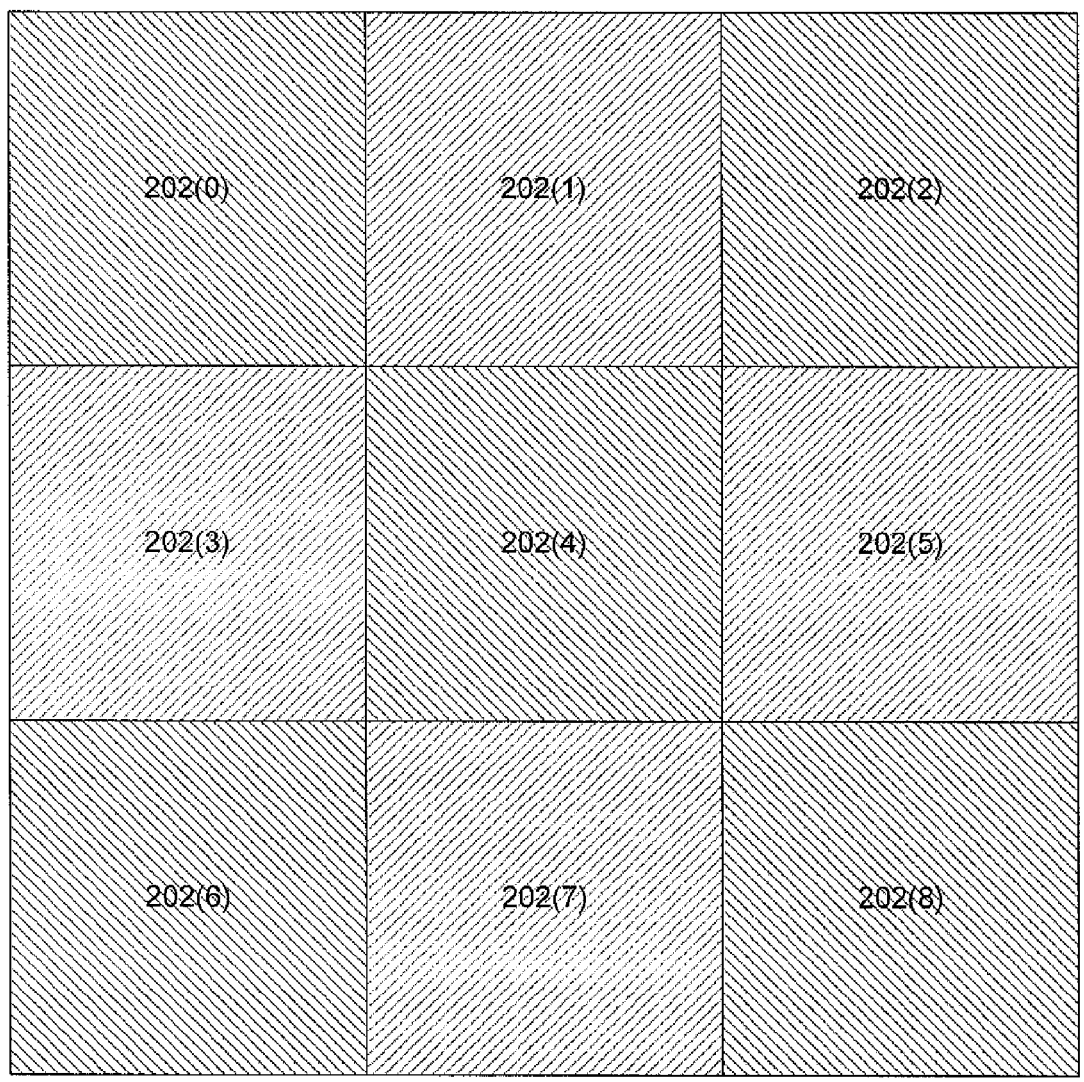

In order to take advantage of the complimentary strengths of the first and second recursion rules 310, 312, the selection logic 314 may be configured to minimize the demand on computational resources, while at the same time, mitigating the impact of the performance disadvantages associated with each of the recursion rules. In one embodiment, the selection logic 314 may implement a switching scheme in which the rules are alternately applied from block to block with the order switching on a column, row, and frame basis. The net result of such as scheme is that any block position is not evaluated using the same recursion rule in consecutive frames. FIGS. 9A and 9B provide an example of such a switching scheme. FIG. 9A is a diagram that shows how a predefined pattern of alternating the first recursion rule 310 and the second recursion rule 312 are applied to blocks 202(0) through 202(8) in a first FRAME(N−1). As shown, the recursion rule applied is alternated from block to block, with the first recursion rule 310 being applied to blocks 202(0), 202(2), 202(4), 202(6), and 202(8), and the second recursion rule 312 being applied to abutting blocks, including blocks 202(1), 202(3), 202(5), and 202(7). FIG. 9B shows the application of the switching scheme to the same set of blocks 202(0) through 202(8) in the subsequent frame, FRAME(N). Here, the predefined pattern of alternating recursion rules also includeds the recursion rules alternated from block to block. In this subsequent frame, however, each block is considered under the other rule. Thus, the first recursion rule 310 is applied to blocks 202(1), 202(3), 202(5), and 202(7), while the second recursion rule 312 is applied to blocks 202(0), 202(2), 202(4), 202(6), and 202(8).

By alternating the recursion rule applied to a given block between frames, and on a block to block basis within a frame, the drawbacks associated with each of the rules are largely mitigated. For example, the drawback in terms of tracking ability associated with the first recursion rule 310 is mitigated because a better motion vector candidate is made available in the 3×3 neighborhood surrounding the block as a result of the use of the second recursion rule 312 in some of the neighboring blocks. At the same time, a high degree of smoothness and consistency of the estimated motion field is maintained because the inherent median operation (e.g., selection of component-wise medians) provided by the first recursion rule 310 serves to limit the propagation of errors which may be introduced by the use of the second recursion rule 312. Because each block 202 is considered by only one of the two recursion rules in a given frame, the demand on computational resources is not increased, but the advantages associated with each rule are exploited.

Figure 10:
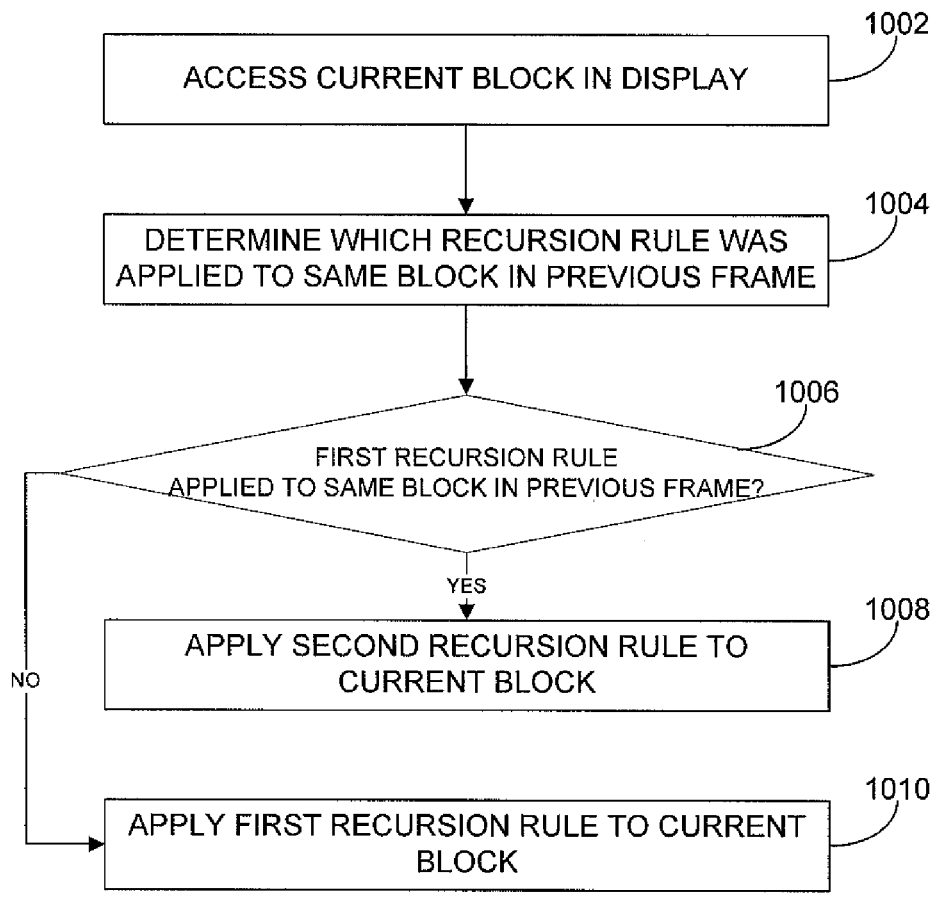
FIG. 10 is a flowchart of a method of providing motion estimation.

Referring now to FIG. 10, a flowchart of one example of how the selection logic 314 may be applied to a frame. The process begins at box 1002 where the current block in the display is accessed by the recursive motion estimation module 300. Next, at box 1004, the estimation module 300 determines which recursion rule (e.g. the first recursion rule 310, or the second recursion rule 312) was applied to the same block in the immediately preceding frame. The process then moves to decision box 1006, where if the first recursion rule 310 was applied to the same block 202 in the previous frame, the process moves to box 1008 and the second recursion rule 312 is applied to the block in the current frame. If the first recursion rule 310 was not applied to the block in the prior frame, the process instead moves to box 1010, where the first recursion rule 310 is applied. Although a particular process for implementing the selection logic 314 is provided in FIG. 10, it is to be appreciated that the selection logic may be implemented in other ways. For example, the recursion estimation module 300 may be configured to track the rule applied to the immediately preceding block, and to simply apply the other rule to the current block.

In view of the embodiments described above, a system and method of providing motion estimation are disclosed which allow for the use of multiple, complimentary recursive motion estimation rules to yield an accurate estimated motion field in a display device, without greatly increasing demand on computation resources. It will be understood by those of skill in the art that numerous and various modifications can be made without departing from the spirit of the present invention. For example, more than two different recursion rules may be implemented to further refine the complimentary advantages provided by each of them. Therefore, it should be clearly understood that the forms of the invention are illustrative only and are not intended to limit the scope of the invention.

What is claimed is:

1. A method of providing motion estimation between video frames in a device, the method comprising:
   receiving a first frame of a video;
   generating a first motion vector for a first block in the first frame of the video using a first recursive motion estimation rule from a predefined pattern alternating the first recursive motion estimation rule and a second recursive motion estimation rule;
   generating a second motion vector for a second block in the first frame of the video using the second recursive motion estimation from the predefined pattern alternating the first recursive motion estimation rule and the second recursive motion estimation rule; and
   determining a modified video from the video with the first motion vector and the second motion vector for displaying on a device.

2. The method of claim 1, further comprising:
   receiving a second frame of the video
   estimating a third motion vector for the first block in the second frame of the video using the second recursive motion estimation rule; and
   estimating a fourth motion vector for the second block in the second frame of the video using the first recursive motion estimation rule.

3. The method of claim 1, wherein the first recursive motion estimation rule and the second recursive motion estimation rule each have different attributes for estimating motion vectors.

4. The method of claim 1, further comprising:
   accessing the first block in the first frame according to a scanning order; and
   accessing the second block in the first frame according to the scanning order, wherein the second block immediately follows the first block in the scanning order.

5. The method of claim 4, further comprising:
   receiving a second frame of the video;
   accessing the first block in the second frame according to a scanning order; and
   accessing the second block in the second frame according to the scanning order, wherein the second block immediately follows the first block in the scanning order.

6. The method of claim 1, wherein using the first recursive motion estimation rule includes evaluating one or more motion vector candidates drawn from at least one spatial and/or temporal neighboring block.

7. The method of claim 6, wherein the at least one spatial and/or temporal neighboring block includes eight blocks surrounding the first block to form a 3×3 grid of blocks.

8. The method of claim 7, wherein using the first recursive motion estimation rule further includes determining a motion vector corresponding to a best error metric among evaluated motion vector candidates.

9. The method of claim 1, wherein using the second recursive motion estimation rule includes evaluating motion vector candidates drawn from an asymmetrical spatial and/or temporal neighborhood of blocks.

10. The method of claim 9, wherein the asymmetrical neighborhood of blocks includes a 5×5 grid of blocks.

11. The method of claim 1, further comprising estimating a motion vector for a block in a second frame using the second recursive estimation rule when the motion vector for a corresponding block in the first frame of the video is estimated using the first recursive estimation rule.

12. A device configured to perform a method of providing motion estimation, comprising:
   a motion estimation module configured to:
      receive a first frame of a video,
      generate a first motion vector for a first block in the first frame of the video using a first recursive motion estimation rule from a predefined pattern alternating the first recursive motion estimation rule and a second recursive motion estimation rule;
      generate a second motion vector for a second block in the first frame of the video using the second recursive motion estimation rule from the predefined pattern alternating the first recursive motion estimation rule and the second recursive motion estimation rule; and
      determine a modified video from the video with the first motion vector and the second motion vector for displaying on a device; and
   a controller configured to receive data from the motion estimation module.

13. The device of claim 12, wherein the motion estimation module is configured to:
   receive a second frame of the video;
   estimate a third motion vector for the first block in the second frame of the video using the second recursive motion estimation rule; and
   estimate a fourth motion vector for the second block in the second frame of the video using the first recursive motion estimation rule.

14. The device of claim 12, wherein the first recursive motion estimation rule and the second recursive motion estimation rule each have different attributes for estimating motion vectors.

15. The device of claim 12, wherein the motion estimation module is configured to:
   access the first block in the first frame according to a scanning order; and
   access the second block in the first frame according to the scanning order, wherein the second block immediately follows the first block in the scanning order.

16. The device of claim 15, wherein the motion estimation module is configured to:
   receive a second frame of the video;
   access the first block in the second frame according to a scanning order; and
   access the second block in the second frame according to the scanning order, wherein the second block immediately follows the first block in the scanning order.

17. The device of claim 12, wherein the motion estimation module is configured to use the first recursive motion estimation rule including evaluating motion vector candidates drawn from at least one spatial and/or temporal neighboring block.

18. The device of claim 17, wherein the at least one spatial and/or temporal neighboring block includes eight blocks surrounding the first block to form a 3×3 grid of blocks.

19. The device of claim 18, wherein the motion estimation module is configured to use the first recursive motion estimation rule including determining a motion vector corresponding to a best error metric among evaluated motion vector candidates.

20. The device of claim 12, wherein the motion estimation module is configured to use the second recursive motion estimation rule including evaluating motion vector candidates drawn from an asymmetrical spatial and/or temporal neighborhood of blocks.

21. The device of claim 20, wherein the asymmetrical neighborhood of blocks includes a 5×5 grid of blocks.

22. The device of claim 12, the motion estimation module is configured to estimate a motion vector for a block in a second frame with the second recursive estimation rule when the motion vector for the block in the first frame of the video is estimated with the first recursive estimation rule.

23. A method of providing motion estimation between video frames in a device, the method comprising:
    receiving a frame of a video, the frame of the video including a plurality of blocks;
    generating a final motion vector for each of the plurality of blocks by alternately applying a plurality of recursive motion estimation rules to each block according to a predefined pattern for alternating the plurality of recursive motion estimation rules;
    determining a modified video from the video with the final motion vector of each of the plurality of blocks for displaying on a device; and
    wherein more than one of the plurality of recursive motion estimation rules is used to estimate motion vectors in the frame.

24. The method of claim 23, wherein the plurality of recursive motion estimation rules are alternately applied across abutting instances of blocks.

25. The method of claim 23, further comprising applying a different motion estimation rule from the plurality of motion estimation rules to a particular block in a subsequent frame compared to the one of a plurality of recursive motion estimation rules applied in the frame occurring before the subsequent frame.

* * * * *